United States Patent [19]

Caplette

[11] 4,305,178
[45] Dec. 15, 1981

[54] HINGE LOCK FOR ANIMAL GATE

[76] Inventor: Edward A. Caplette, 901 NW. 31st Ave., Lot 45, Pompano Beach, Fla. 33060

[21] Appl. No.: 149,934

[22] Filed: May 14, 1980

[51] Int. Cl.³ ..................... E05B 15/02; E05C 19/10; E05D 7/10
[52] U.S. Cl. ....................................... 16/258; 16/380; 292/DIG. 13
[58] Field of Search ................ 16/160, 192, 169, 137, 16/172, 177; 292/DIG. 17, DIG. 29, DIG. 13, 340, 341, 341.15, 341.17, 107; 49/160

[56] References Cited
U.S. PATENT DOCUMENTS 2,219,228  10/1940  Hines .................................. 292/107
2,825,594   3/1958  Hatchette, Sr. ................ 292/340 X
2,827,322   3/1958  Barbour et al. ................. 292/340 X
3,653,703   4/1972  Lochner ..................... 292/DIG. 13

Primary Examiner—Werner H. Schroeder
Assistant Examiner—Andrew M. Falik
Attorney, Agent, or Firm—Oltman and Flynn

[57] ABSTRACT

The present lock is for use on an animal gate hinge having an eye fastened to the animal enclosure and a rod fastened to the gate and extending from it across the top of the eye and then down through the eye. This lock has a lower ring which can be slid up onto the exposed lower end of the rod below the eye and a latch swiveled to the ring and extending up from it for releasable attachment to the rod between the gate and the eye.

4 Claims, 4 Drawing Figures

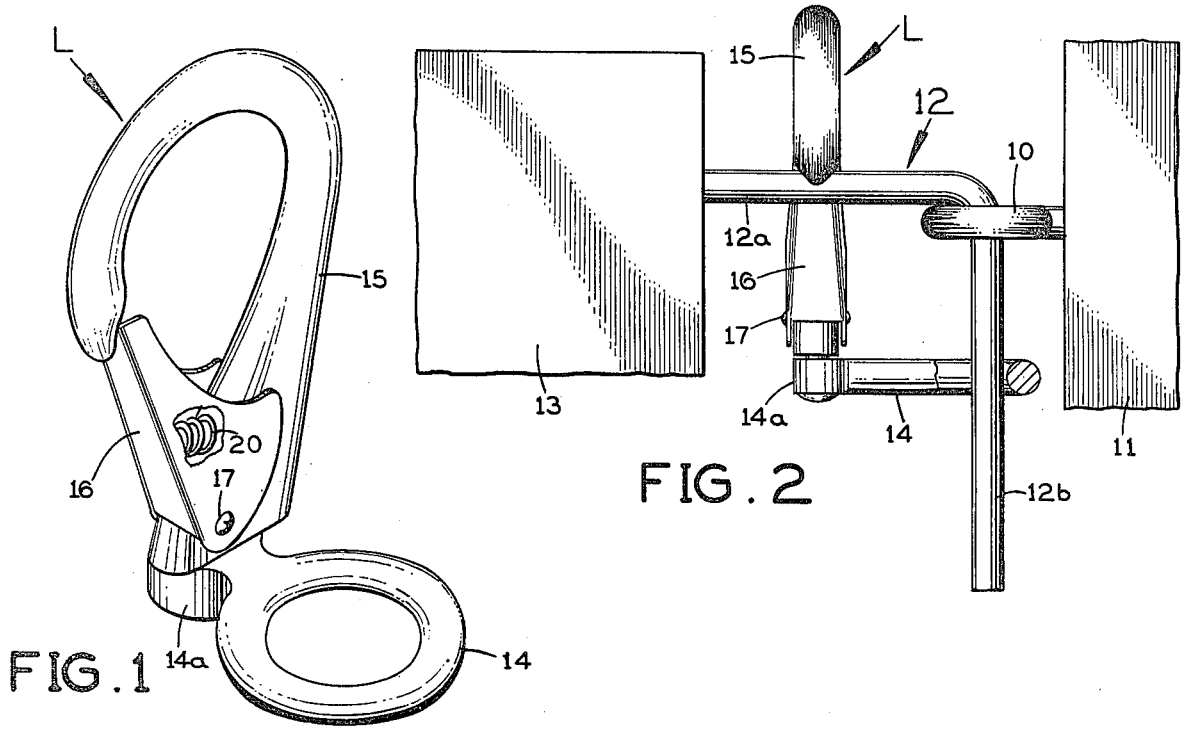
FIG. 1
FIG. 2
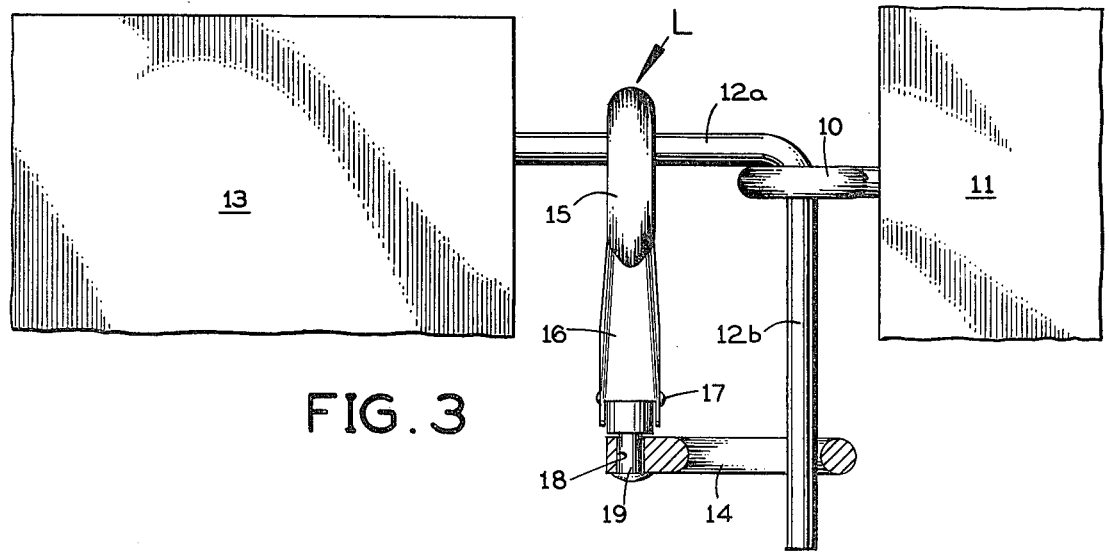
FIG. 3
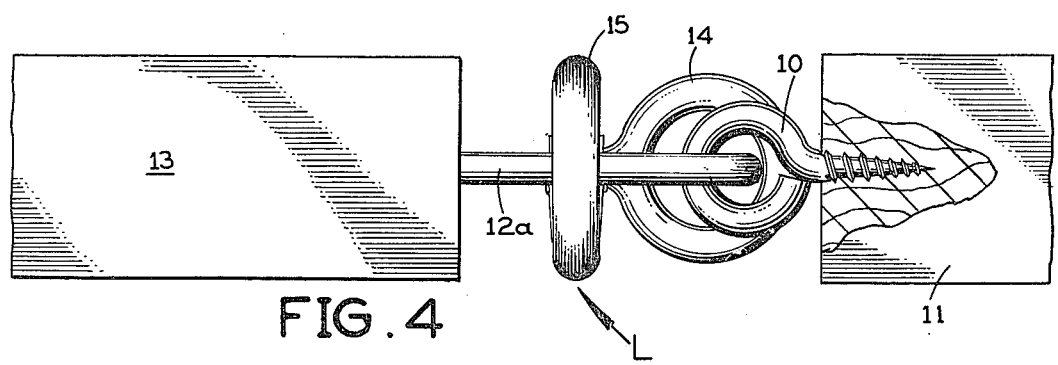
FIG. 4

HINGE LOCK FOR ANIMAL GATE

SUMMARY OF THE INVENTION

This invention relates to a lock for attachment to the hinge of a gate for an animal enclosure, particularly a horse gate.

Gates for horse stalls at race tracks and training centers often have very simple hinges, each consisting of a horizontal eye fastened to the stall and a rod fastened to the gate and presenting a horizontal leg which extends across the top of the eye and a vertical leg which extends down through the eye and defines the pivot axis for the gate. The weight of the gate is all that keeps such a hinge assembled. A clever horse can disconnect the gate hinges simply by pushing the gate up far enough to lift the vertical leg of each rod out of the corresponding eye. With the gate hinges disconnected, the horse can then escape from the stall.

The present invention is directed to a novel lock for preventing a horse or other animal from disconnecting such a hinge. In the presently preferred embodiment it comprises a lower ring which may be applied to the exposed lower end of the vertical leg of the rod, and a latch which extends up from the lower ring and may be opened to receive the horizontal leg of the rod, after which it closes around that leg. Preferably, the latch comprises a hook with a swivel connection to the lower ring and a closure plate pivoted to the hook and spring-biased to a position closing the gap in the hook. The closure plate pivoted to a position which leaves the gap open when the latch is being applied to the horizontal leg of the hinge rod and then springs back to close the gap so that the latch surrounds the horizontal leg of the hinge rod. Upward displacement of the gate by a horse or any other cause will move the lower ring of the lock up against the eye before the vertical leg of the hinge rod is completely out of the eye, thereby preventing the hinge from coming apart under these circumstances.

A principal object of this invention is to provide a novel and improved lock which may be readily attached to or removed from a gate hinge of the general type described.

Another object of this invention is to provide such a lock which prevents such a hinge from being taken apart simply by forcing the gate upward, as a horse might attempt to do.

Further objects and advantages of this invention will be apparent from the following detailed description of a presently-preferred embodiment thereof, shown in the accompanying drawing.

DESCRIPTION OF THE DRAWING

FIG. 1 is a perspective view of the present lock;

FIG. 2 is a side elevation showing the lock being applied to a gate hinge;

FIG. 3 is a similar view showing the position of the parts after the lock has been put on; and FIG. 4 is a top plan view of the FIG. 3 assembly.

DETAILED DESCRIPTION

Referring to FIG. 2, a known type of gate hinge commonly used in horse stables comprises a horizontal eye 10 fastened to a post 11 and a right-angled hinge rod 12 fastened to one end of the gate 13. Obviously, there will be two or more vertically spaced hinges for each gate. The hinge rod 12 has a horizontal leg 12a, which extends from the gate 13 toward the post 11 and passes part way across the top of the eye 10, and a vertical leg 12b, which extends down from the horizontal leg 12a through the eye 10.

Obviously, with such gate hinges it is only the weight of the gate itself that holds the hinge assembled. A horse can take such hinges apart simply by pushing the gate up a few inches. After disconnecting the gate hinges, the horse can escape from the stable, and this has happened many times. The purpose of the present invention is to prevent this.

The present lock comprises a lower ring 14 and a manually operable latch L extending up from the ring. This latch comprises a hook 15 and a closure plate 16 pivoted at 17 to the hook and normally closing the gap in the hook. At one side the lower ring has a radial extension 14a formed with a vertical opening 18 (FIG. 3) which rotatably receives a stem 19 on the lower end of the hook 15. This provides a swivel connection between the hook and the lower ring, enabling the hook to rotate on a vertical axis.

A coil spring 20, shown in phantom in FIG. 1, is engaged under compression between the hook 15 and the closure plate 16 to bias the latter to the closed position shown in FIG. 1. The closure plate 16 may be retracted (clockwise in FIG. 1) to a position opening the gap in the hook, either manually or by pushing it against the horizontal leg 12a of the hinge rod 12.

The lock is applied to the hinge by first moving the lower ring 14 from below up along the exposed lower end of the vertical leg 12b of the hinge rod until the closure plate 16 of the latch is opposite the horizontal leg 12a of the hinge rod, as shown in FIG. 2. Then the latch is opened by retracting the closure plate 16, either manually or by pushing it against the horizontal leg 12a of the hinge rod, until the top of the latch hook 15 extends completely across leg 12a. Then the lock may be released, dropping down to the position shown in FIG. 3. The spring 20 returns the closure plate 16 to the closed position shown in FIG. 1, so that the latch 15, 16 encircles the horizontal leg 12a of the hinge rod.

With the lock in place, if a horse pushes the gate up, the lower ring 14 of the lock will engage the bottom of the eye 10 before the vertical leg 12b of the hinge rod is completely out of the eye. Consequently, the lock prevents the hinge from coming apart when the gate is raised.

It will be apparent that the present lock is easily applied manually to the gate hinge and is easily removable from it manually.

I claim:

1. For use with the hinge of a gate for an animal enclosure, said hinge having a horizontal eye fastened to the enclosure and a rod fastened to the gate and having a horizontal leg extending across the top of the eye and a vertical leg extending from said horizontal leg down through the eye and having a free lower end exposed below the eye, a manually attachable and removable lock comprising:

a horizontal lower ring defining a vertical opening and slidably insertable from below onto said vertical leg of the rod below the eye;

and a latch extending up from said lower ring for engagement with said horizontal leg of the rod at one side of the eye when said lower ring is on said vertical leg of the rod below the eye, said latch having relatively movable parts which are separable to open the latch for receiving said horizontal leg of the rod when the latch is applied thereto, said movable parts of the latch being movable together to close the latch around said horizontal leg of the rod after being applied thereto, whereby to prevent the rod from being lifted out of the eye to disconnect the hinge.

2. A lock according to claim 1, and further comprising means providing a swivel connection between said latch and said lower ring which enables said latch to rotate with respect to the ring on a vertical axis.

3. A lock according to claim 1, wherein said latch comprises:

a hook coupled to said lower ring and extending upward therefrom, said hook defining a gap;

a closure plate pivoted on said hook for closing said gap;

and spring means biasing said closure plate to a position closing the gap in the hook, said spring means being yieldable to permit said closure plate to pivot to a position opening the gap in the hook to enable the latch to be applied to said horizontal leg of the rod.

4. A lock according to claim 3, wherein said hook has a swivel connection at its lower end to said lower ring which permits the hook to be turned with respect to the ring on a vertical axis.

* * * * *